Figure 3:
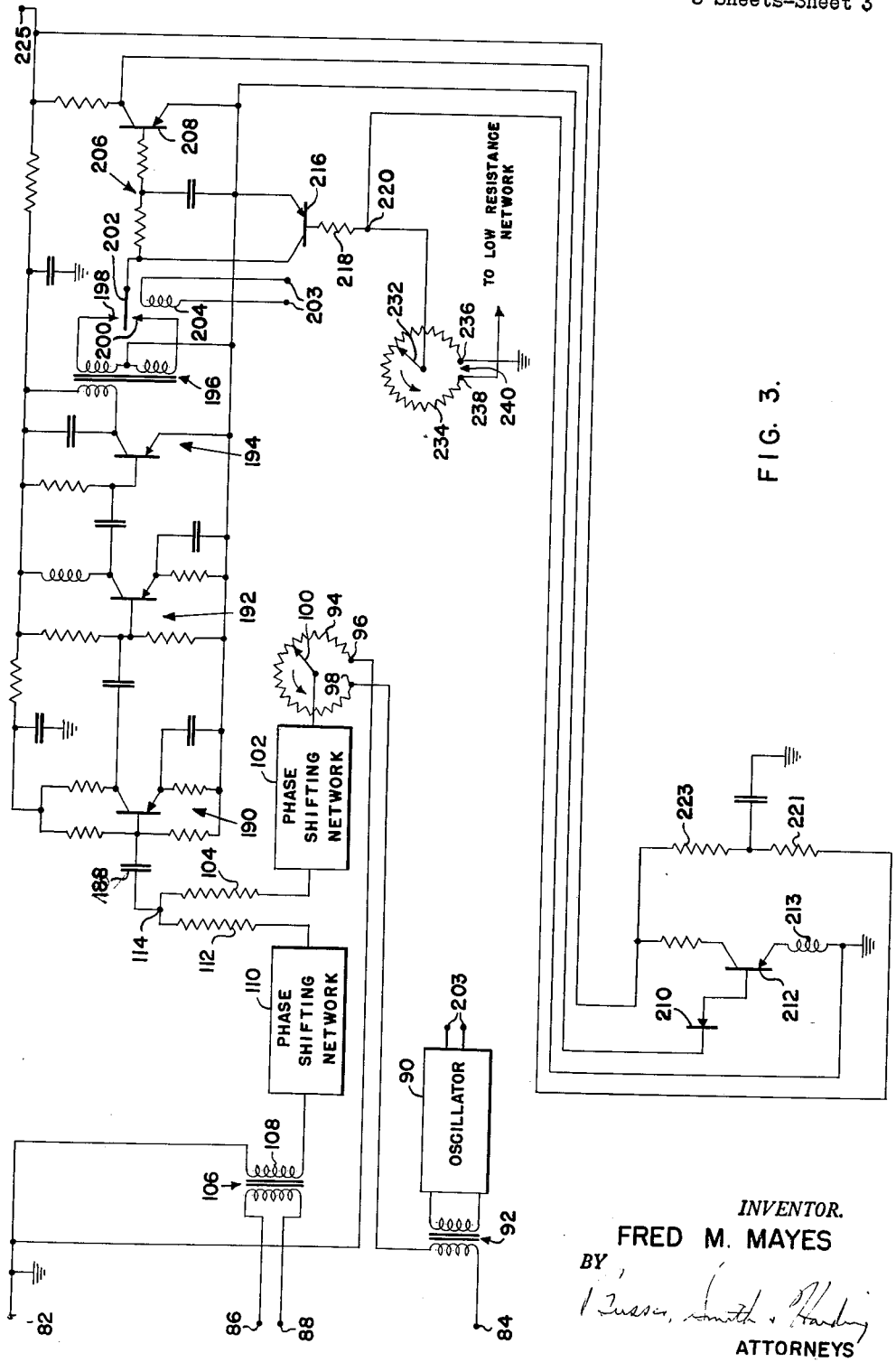

Nov. 20, 1962
F. M. MAYES
3,065,406
BORE HOLE LOGGING APPARATUS
Filed Oct. 21, 1959
3 Sheets-Sheet 1
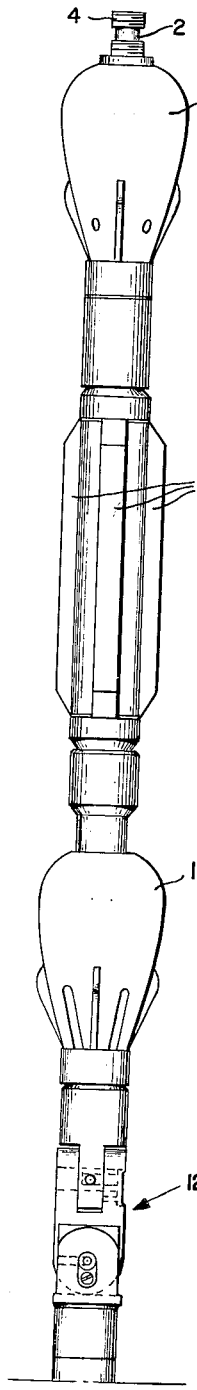
FIG. IA.
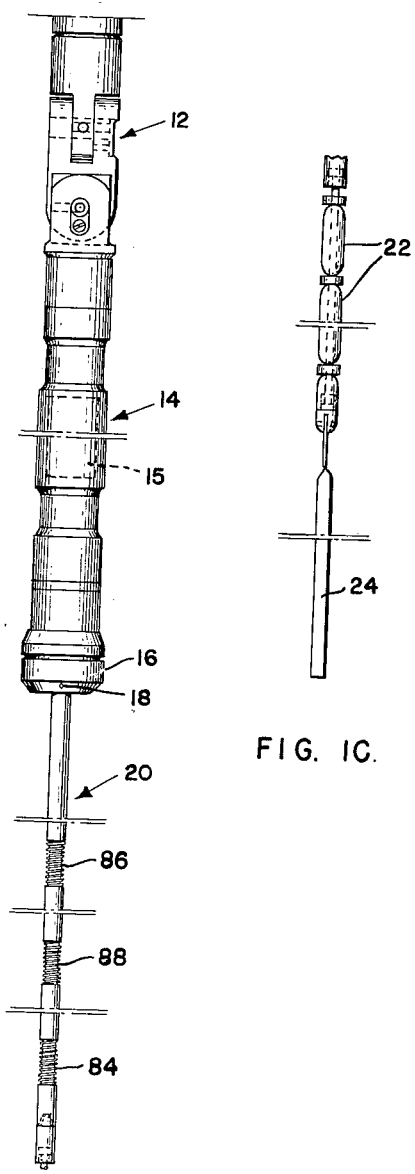
FIG. IB.
FIG. IC.
INVENTOR.
FRED M. MAYES
BY
Busser, Smith, Harding
ATTORNEYS

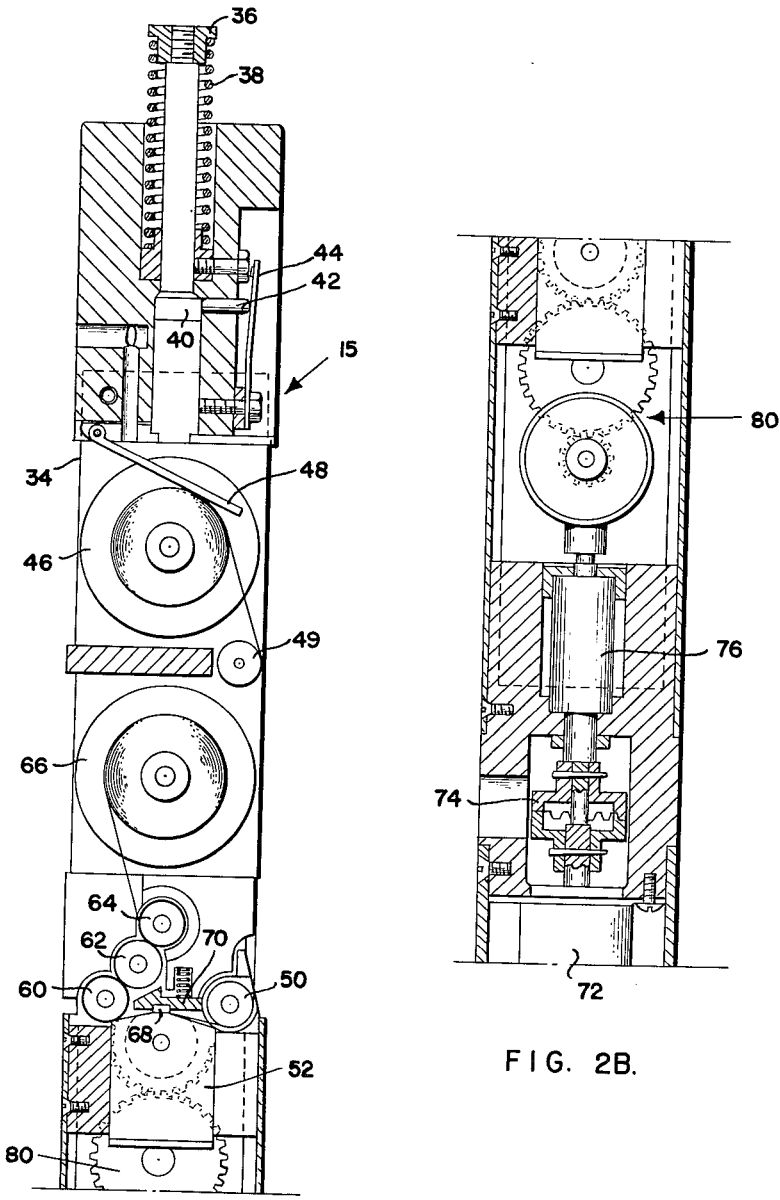

Nov. 20, 1962

F. M. MAYES 3,065,406

BORE HOLE LOGGING APPARATUS

Filed Oct. 21, 1959

3 Sheets-Sheet 3

INVENTOR.
FRED M. MAYES
BY
*Fusser, Smith & Harding*
ATTORNEYS

United States Patent Office 3,065,406
Patented Nov. 20, 1962

3,065,406
BORE HOLE LOGGING APPARATUS
Fred M. Mayes, Richardson, Tex., assignor to Sun Oil Company, Philadelphia, Pa., a corporation of New Jersey
Filed Oct. 21, 1959, Ser. No. 847,757
6 Claims. (Cl. 324—1)

This invention relates to bore hole logging apparatus and particularly to apparatus involving the location of recording apparatus within a hole.

In the applications of Mayes and Jones, Serial Nos. 683,027 and 818,066, filed, respectively, September 10, 1957, and June 4, 1959, logging methods and apparatus are provided which overcome the disadvantages of conventional logging apparatus which involves the recording of information at the surface. In accordance with the disclosures of said applications, logging methods and apparatus are provided which may be used when a drill spring is in a bore hole and may be used at any time with a minimum of interruption in drilling. Not only may the logging be accomplished just prior to removal of the drill string for the purpose of changing a bit, but the logging may be carried out to be promptly followed by a continuation of drilling. A self-contained energizing and recording apparatus may be dropped through a drill string in go-devil fashion or may be pumped down therethrough when the drill string has been lifted to only a limited extent from the bottom of the hole to provide a region for reception of an electrode or other logging assembly. The apparatus particularly includes an assembly of a type suitable to pass through the mud flow openings of a jet bit which may be of any of the conventional popular types. Such bits are presently widely used since they effect the carrying away of cuttings and avoid their reworking by the drill. These jet openings are generally at relatively small angles with respect to the drill stem axis, and a flexible assembly may, accordingly, be projected therethrough to extend beneath the bit.

The self-contained assembly lowered to the vicinity of the bit contains, for electrical logging, not only means for supplying current to the earth, but also means for recording various potentials at the electrodes of the assembly.

Recording in a self-contained instrument within a drill stem within a bore hole has always presented substantial difficulties because of the limited diametral space afforded. Without the possibility of reference to some standard frequency supply line, there is difficulty in providing constant speed of transport of the recording medium. Furthermore, since the apparatus used must be kept to a minimum, stability of measuring circuits is difficult to maintain.

According to the disclosures of said applications, exciting and recording apparatus are provided which are self-contained and sufficiently simple in construction to be housed in an apparatus which may pass through a drill stem. A pulse width modulation recording system was used which was essentially independent of supply voltage changes and of the transport speed of the recording medium, specifically, a magnetic tape.

Also avoided in accordance with said disclosures was the difficulty of maintaining constant current to the current electrode or electrodes. The record was dependent solely on the ratios of potentials to the current introduced into the earth, and, consequently, valid and interpretable results were secured in view of the fact that the electrical configuration presented by the earth is linear.

In said applications the disclosure relates to apparatus involved particularly in the use of an electrode assembly for electrical logging to provide records of the so-called short normal, long normal and self-potential types.

It is the general object of the present invention to provide apparatus for securing records similar to those produced in accordance with said applications but from a different type of electrode arrangement which does not lend itself directly to recording in accordance with the disclosures of said applications. The invention particularly relates to the recording of logs produced by an array of electrodes involving considerably spaced current electrodes with the provision of a pair of potential electrodes relatively closely spaced with respect to each other and more or less midway between the current electrode. Such an array is designed to produce what is commonly referred to as a lateral curve or log.

The general object of the invention as well as subsidiary objects particularly relating to details of construction and operation will become apparent from the following description, read in conjunction with the accompanying drawings, in which:

FIGURES 1A, 1B and 1C illustrate a typical physical assembly of the apparatus which may be used, FIGURE 1B being a continuation of the lower portion of FIGURE 1A, and FIGURE 1C being a continuation of the lower portion of FIGURE 1B;

FIGURES 2A, and 2B jointly constitute a fragmentary longitudinal section showing a portion of a recording assembly, FIGURE 2B providing a continuation of the lower portion of FIGURE 2A; and FIGURE 3 is a wiring diagram showing the electrical aspects of the recording apparatus.

The mechanical aspects of the apparatus are shown only in sufficient detail to indicate the general assembly, the assembly being described in full in the application of Mayes and Jones, Serial No. 818,066, referred to above, and in the application of Bennett, Chaney, Jones and Mayes, Serial No. 818,162, filed June 4, 1959. The apparatus particularly shown is that which is used by being freely dropped within a drill string without surface connection. It comprises a stem 2 threaded at 4 for the reception of a spearhead or other device depending upon the fashion in which operation is to occur. A parachute element 6 in the form of a bulb-like structure of flexible wear-resisting rubber is provided at the upper end of the assembly, its diameter being desirably normally slightly greater than of the major portion of the bore of the drill stem so that it acts to slow down the relative velocity of the assembly with respect to the velocity of downflow of the drilling fluid. Below this are the elongated shoes 8 which are spring urged outwardly to a position in which the outer diameter to which the shoes move is restricted so as to be less than the internal diameter of the drill stem but greater than the smaller internal diameter of the drill collar. Thus, during the major portion of the descent and until the shoes enter the drill collar they perform no function in effectual retarding of the descent of the assembly. However, the shoes enter the drill collar shortly before the lower end of the electrode assembly reaches the position of entrance to a jet opening of a bit.

Below the shoes 8 there is another parachute element 10 which functions similarly to the parachute element 6. A universal joint indicated at 12 connects the foregoing to a protective housing 14 within which the recording apparatus is located together with power supply and timing means. This assembly is generally indicated at 15. At the lower end of the housing is a connecting and adaptor arrangement indicated at 16 providing an electrical ground for the apparatus and in particular having sharp projecting conducting pointed elements 18 to dig into a seat in the lower end of the drill string above a bit to extend the electrical ground to the drill string itself.

Extending downwardly from the arrangement at 18 is the flexible electrode assembly 20 which carries the electrodes described as to their arrangement later. Below the electrodes are weighting elements 22 and a flexible strip 24 of leather or plastic which facilitates entrainment of the flexible assembly in the mud flow to effect guidance of the electrode assembly into and through a jet opening in the bit. The weighted electrode assembly is of the type shown in said Mayes and Jones application, Serial No. 818,066 and constitutes the subject matter of an application of Bennett, Chaney and Mayes, Serial No. 818,189, filed June 4, 1959.

The foregoing apparatus functions as is described in detail in the aforementioned applications, and is, as shown, particularly designed for a logging arrangement in which the apparatus as lowered is free of surface connection, the logging being accomplished by movement of the drill stem through the desired length of hole either upwardly or downwardly. In an alternative method of logging in which, during logging, the drill stem is stationary and the recording apparatus and the electrode assembly supported thereby are moved vertically by the use of a wire line, the parachutes and shoe elements 8 may be omitted, since in such case lowering may be effected under surface control through the wire line. In such case the electrode assembly may be of very considerable length so as to traverse the portion of a bore hole between its bottom and the considerably raised bit.

Reference may next be made particularly to FIGURES 2A and 2B showing the mechanical arrangement of parts of the current-supplying and recording assembly 15 located within the protective housing 14.

A frame 34, which need not be described in detail, is formed of an assembly of parts and provides mountings for the mechanical and electrical elements of the recorder. At its upper end it mounts a plunger 36 normally extended outwardly by a spring 38 and, when in such position, locating a cam 40 so as to act upon the pin 42 to open a switch 44 which constitutes a master switch disconnecting the power-supplying battery from the apparatus. When the plunger is pushed inwardly this switch is closed, the inward movement of the plunger taking place as the top plug is inserted into the protective housing.

A magnetic tape supply reel is indicated at 46, and resting on the tape is a spring-urged arm 48 which constitutes a second switch element grounded to the hub of the tape supply reel when the tape is exhausted. The tape from the supply reel 46 passes over a guide roller 49 and about an idler 50 and thence over the curved face of a multiple channel recording head 52. From this it winds about the successive capstan rollers 60, 62 and 64 which are geared together to provide a positive and uniform drive, thence passing to the takeup roller 66. In its passage over the head 52 the tape is pressed thereagainst by a pad 68 carried by a spring-urged lever 70. The capstan rollers are driven by means of gearing indicated at 80 from connections to a battery-powered drive motor indicated at 72. In order to take care of alignment the motor drives through a clutch 74 the shaft of a dual potentiometer 76 to the shaft of which the gearing 80 is connected. It may be here noted that as a result of the drive of the potentiometers at 176 in synchronism with the drive of the tape, the potentiometers at 176 which will be referred to in more detail hereafter, complete single revolutions of their wiping contacts during predetermined advancements of the tape. The recording is thus made independent of maintenance of constant speed of the motor 72.

The foregoing mechanical arrangement is illustrated and described in the application of Mayes and Jones, Serial No. 818,066. This also describes a timing and control mechanism which is advantageously used in connection with the present invention but forms no direct part thereof and hence is not further described.

An item of auxiliary equipment which is desirably provided is a detecter of motion, either longitudinal or rotary, of the drill stem to provide markings on a channel of the tape indicative of initiations or interruptions of logging intervals. Such detecters form the subject matter of an application of Bennett, Chaney and Mayes, Serial No. 818,163.

In Mayes and Jones application, Serial No. 818,066, the electrical portions of the apparatus are described as units, and such units are desirably employed in the present apparatus. However, since, with the exception of one unit, they form no essential part of the present invention, the desirable units may be merely referred to briefly with reference to said Mayes and Jones application for details. One such unit is provided for the purpose of initiating and terminating control automatically, and comprises the battery which is used for furnishing power. So far as the present invention is concerned it may be considered merely that some switching unit provides power at the desired time after the electrode assembly has been projected through a bit opening.

Another unit described in detail in said Mayes and Jones application is an oscillator. Desirably this oscillator is as described therein of a type consuming a minimum of power, such as a transistor oscillator, but the oscillator involved may be of any desired type furnishing current at a desired frequency which may typically be in the audio frequency range and about four hundred cycles per second. The frequency is quite arbitrary and so far as frequency relationships are involved it need only be stated that the frequency is desirably considerably greater than that of a cycle of the potentiometers at 76.

Referring now to FIGURE 3, the electrode assembly involved in the present apparatus comprises the electrodes 82, 84, 86 and 88. The first of these may be constituted by the housing 14 and, through its electrical contact with the drill stem, the drill stem assembly itself. An extended ground is thus provided. The electrode 84 is at the lower end of the electrode assembly very substantially spaced from the bit when the apparatus is in use. It may be here remarked that the electrode at 82 may be an uppermost electrode of the electrode assembly, moving with the other electrodes, when the logging is carried out by movement of the electrode assembly relative to the bit under wire line control from the surface. In such case, the drill stem assembly may not be involved in the electrical configuration of interest, the bit being above the uppermost position attained by the electrode 82 during logging.

The electrodes 86 and 88 constitute potential electrodes and are desirably relatively close to each other and spaced from both the electrodes 82 and 84. While it is sometimes desirable to have the electrodes 86 and 88 approximately midway between the electrodes 82 and 84, in which case the potential electrodes are subject to the influence of both of the current electrodes; but this is not essential, and, in fact, it is usually more desirable, to have the electrode 82 far removed from the potential electrodes and extensive so that the potential difference is substantially independent of the conditions about the electrode 82 which may be regarded as at "infinity." In such case the electrode 82 is conveniently constituted by the drill pipe to form a ground of negligible resistance. A further advantageous arrangement is that in which the potential electrodes are below the lowermost current electrode, allowing, if one potential electrode is used for self-potential pickup, both resistivity and self-potential to be logged closer to the bottom of the hole.

The oscillator 90 supplies current to the current electrodes 82 and 84 through the transformer 92. As shown, one terminal of its secondary is connected to the electrode 84 and its other terminal to one end 98 of a circular linear potentiometer resistance 94, the other terminal 96 of which is connected to the electrode 82. This potentiometer 94 is one of those embodied in the potentiometer assembly 76. The wiper 100 of the potentiometer is connected through a phase shifting network 102 of conventional construction and through an adding resistor 104 to the terminal 114 which is connected to the input side of a capacitor 188.

The potential electrode 86 and 88 are connected to the primary of a transformer 106, the secondary of which has one terminal connected to the electrode 82 and its other terminal through a phase shifting network 110 of conventional type and an adding resistor 112 to the terminal 114. The connections are such that the terminal 114 receives the algebraic sum of the input signals through resistors 104 and 112, these input signals being 180° out of phase with each other. Polarities of connections are so chosen that the range of variation of potential of the arm 100 as it makes a revolution so exceeds the signal derived from the electrodes that during such revolution the point 114 passes through a zero potential value with a phase change of 180° of the resulting output to the capacitor 188. The potentiometer arm 100 may make several hundred revolutions per minute.

While two phase shifting networks 102 and 110 have been illustrated, only one of them need generally be used, since the phase shift involved is merely that of bringing into phase (or 180° out of phase) the inputs to the terminal 114.

The input provided through the capacitor 188 is delivered to an amplifier comprising the three transistor stages 190, 192 and 194, the last of which delivers its output through the transformer 196.

The phase shifting network or networks are necessary only to correct phase shift in the transformer or due to mutual inductance or capacitance in the wiring, or to obtain correct phase relation between the added signals and the chopper contacts hereafter described which are usually not in phase with the driving voltage. Phase shift correction is not necessary to bring the potential electrode signals into phase with the earth current, this being always the case.

A synchronous rectification system is desirable in view of the relatively small signals which are picked up, particularly because a correspondingly large quadrature signal may accompany these. Synchronous rectification of the signal which contains possibly a large quadrature component gives the maximum rejection of this component and consequently passes only the signals in proper phase relation with the oscillator. Furthermore, as will become apparent, synchronous rectification gives rise to a simple system for incorporating on the record the indication of zero time for the recording cycle.

The centrally grounded secondary of transformer 196 has its end terminals connected to contact points 198 and 200 of a chopper which has a vibrating contact 202 driven synchronously by the coil 204 which is energized from the terminals 203 connected to the oscillator output. The phasing of the synchronous rectification is so made that operation is effected as will become apparent. The chopper contact 202 is connected through the filter 206 to the base of the transistor 208. This is followed by the Zener diode connection 210 to the transistor 212 which serves to provide recording current through a coil 213 of one channel of the recording head 52 previously mentioned. In the operation of the circuit there is involved the transistor 216 having its collector connected to the chopper element 202, its emitter grounded, and its base connected through resistor 218 to a terminal 220 and also through the series arrangement of resistors 221 and 223 to a positive supply terminal 225. The terminal 220 is connected to the wiper 232 of the potentiometer 234 which has terminals 238 and 236, the latter being grounded. There is a gap between the two terminals as indicated at 240. The terminal 238 is connected to a low resistance network having at all times low potential relative to ground. Further remarks with respect to this network will be made hereafter, though so far as operation in accordance with the present invention is concerned this may be treated as merely a low potential source.

The operation of what has been described is as follows:

First, let it be assumed that the transistor 216 is absent. Considering a start with the wiper 100 at the position of the grounded terminal of its resistance, and moving counterclockwise, the potential appearing at the capacitor 188 due to the potential pickup will exceed, but will be 180° out of phase with, that derived from the potentiometer, and the resultant potential will be amplified through the amplifier stages and delivered to the synchronous rectifier. A direct potential will then result at the base of the transistor 208 which, due to proper phasing of the synchronous rectifier will at this time be positive so that the transistor 208 is conducting. It may be noted that the saturation of the last amplifier stage is not of particular significance, a sufficiently positive signal being provided to the base of transistor 208 to maintain it conducting even though the picked up signals are relatively weak. So long as transistor 208 is conducting, the transistor 212 is nonconducting and consequently recorded current does not pass through the recording head winding 213. As the potentiometer wiper continues to move, the potential introduced from the potentiometer rises until a point is reached where the in-phase component of the potential at the input to capacitor 188 becomes zero by reason of the balancing of the electrode signal. As operation passes through this point, the phase of input to the synchronous rectifier is changed through 180° and the singal delivered to the base of transistor 208 becomes negative. Transistor 208 accordingly becomes non-conducting, and transistor 212 conducts to supply recording current to the winding 213. As further movement of the potentiometer contact continues, the recording signal likewise continues.

Assuming that transistor 216 was absent, the last described condition would terminate as the potentiometer wiper reached the end terminal of its resistance and passed into the gap. On entering the gap the earth signal alone would be presented at the amplifier input, and as a consequence a positive signal would be delivered to the base of transistor 208, terminating the recording. It is desirable, however, to present a signal of zero time at the instant that the wiper 232 engages the ground terminal 236 of the potentiometer 234 (this being particularly desirable if multiple channel recording is to be effected), and for this reason a control is effected under the action of transistor 216 as follows:

Prior to passage of the contact 232 into the gap 240, the potential introduced at terminal 220, considering the resistors 221 and 223 to be of high value, is relatively low in magnitude and immaterial, the potential at 238 being low and the resistances 234 being small. However, when the wiper or contact 232 enters the gap 240, the potential of terminal 220 rises to the high positive potential of the supply terminal 225, rendering the transistor 216 highly conductive. The result is, effectively, grounding of the synchronous rectifier contact 202, so that, even though the signals introduced to this rectifier would otherwise produce a positive potential at the base of transistor 208, the base is actually held substantially at ground potential with the result that the transistor 208 remains non-conducting, and transistor 212 continues to conduct and provide a recording signal. This condition continues until the wiper 232 reaches ground potential, whereupon the transistor 216 is cut off, and the transistor 208 immediately becomes conducting since, at this same time, a positive signal is the response of the synchronous rectifier to the earth signals. Transistor 212 is then cut off.

Summarizing the foregoing, the signal recorded by the head starts with the balancing of the inphase component of the potential applied to capacitor 188 at a zero value and continues until the wiper 232 reaches its ground contact at 236, the latter time representing the zero reference time for the potentiometer cycle. The record, accordingly, consists of a series of "dashes," the extents of which along the tape measure the logging signals picked up. It may be noted that since the potentiometer 94 carries the current introduced to the earth, the recorded resistivity measurement is independent of the earth current, there being secured a record corresponding to the ratio of the picked up potential to the earth current.

In the foregoing discussion the potentiometer 234 was treated merely from the standpoint of its function in maintaining the recording current by reason of effective grounding of the terminal 220 except when the wiper 232 was in the gap 240. Actually, and as described in the Mayes and Jones application, Serial No. 818,066, this potentiometer may be that used in effecting self-potential records, for which purpose the direct or slowly varying input signal from one of the electrodes may be utilized as described in that Mayes and Jones application. Such recording, though it changes the potential at 238, does not affect the operation described since the potential at 238 is always low.

In this art it is usually desirable to have multiple records made simultaneously, and it will be evident that other potentials may be picked up and recorded by the use of suitable auxiliary circuitry in conjunction with that described as effecting the special recording due to the use of the electrode arrangement shown herein.

The correlation of the single or multiple records with the depths at which they are produced may be carried out in various fashions. Theoretically simple but not too practical in a system in which the motor 76 is accurately controlled as to speed (so that the zeros of the recording cycles occur at regular intervals) or in which timing marks are produced on the recording tape at clock-controlled equal intervals. The former of these systems requires rather elaborate electrical controls when batteries are used as power sources because of isolation of the apparatus from a surface, fixed frequency, alternating current supply. The latter requires a clock synchronized with a surface clock. In both systems elaborate records are necessary at the surface giving a record of depth against time.

It is simpler to permit the tape to advance at a speed corresponding to that of the motor which, though desirably designed for reasonably constant speed despite drain on the driving battery as logging proceeds, may have a speed substantially variable over a long period of time. Using a well built and sufficiently powerful motor, it is found justifiable to assume a constant speed throughout any period of drill stem movement between stoppages for removal of drill stem sections. Furthermore, measurements have shown that it is possible to assume validly that the rate of movement of a drill stem during lifting (or lowering) periods is constant. Accordingly, it is possible to use only the logging records above described to correlate the records with depth since absences of changes of the records define those portions made during fixed vertical positions of the drill stem occurring as sections are removed or added. Accordingly by keeping records at the surface of depths corresponding to cessations of vertical movement of the drill stem and by making the assumption of substantially constant speed of tape advance throughout individual vertical movement periods and of uniform lifting or lowering movements (these assumptions permitting interpolation) complete correlations of records with depth may be secured. Doubts which may sometimes exist as to the precise points on records at which vertical movements began or ended, for example because of variations in the records due to disturbances of the electrodes caused by mud flows, may generally be resolved by quite valid assumptions that the tape speed was substantially constant throughout several successive periods of vertical movement.

However, it is desirable to provide independent records on the tape of drill stem motions, rotary or vertical, in accordance with the disclosure of the Bennett, Chaney and Mayes application, Serial Number 818,163, referred to above. In the case of control of movement of an electrode assembly through a portion of the hole below the bit under wire line control rather than by drill stem movements markers may be produced by stopping or starting the motion of the wire line, or the motion of the wire line may be continuous and uniform from beginning to end of the logging with assumption of uniform tape speed if the logging interval is not too long.

It will be evident that various details of construction and operation may be modified without departing from the invention as defined in the following claims.

What is claimed is:

1. Bore hole logging apparatus comprising a housing adapted to be moved lengthwise in a bore hole, electrode means secured to said housing to be lowered therewith, means providing a ground connection to the earth surrounding the hole being logged, said electrode means including at least one current electrode and a pair of potential electrodes located in fixed relationship with said current electrode, means in said housing providing current to the earth through said current electrode and said means providing a ground connection, means in said housing advancing a record member at a rate independent of the rate of movement of the housing in the bore hole, and means in said housing for picking up the difference of potential of said potential electrodes produced by said current and providing within said housing a pulse space modulated record of said difference of potential on said record member, the cycles of which record have a substantially constant length along the record member.

2. Logging apparatus according to claim 1 in which said housing is adapted to be moved through a drill stem and in which said electrode means is flexible so as to pass through a non-axial opening in a bit carried by the drill stem.

3. Logging apparatus according to claim 1 in which said potential electrodes are close to each other and approximately midway between said current electrode and said means providing a ground connection.

4. Logging apparatus according to claim 2 in which said potential electrodes are close to each other and approximately midway between said current electrode and said means providing a ground connection.

5. Bore hole logging apparatus comprising a housing adapted to be moved lengthwise in a bore hole, electrode means providing a ground connection to the earth surrounding the hole being logged, said electrode means including at least one current electrode and a pair of potential electrodes located in fixed relationship with said current electrode, means in said housing providing current to the earth through said current electrode and said means providing a ground connection, and means in said housing for picking up the difference of potential of said potential electrodes produced by said current and providing within said housing a pulse space modulated record of said difference of potential, the last mentioned means including means providing a cyclically varying potential having a predetermined waveform proportional in amplitude to said current provided to the earth, means sensitive to a predetermined relationship between said difference of potential and said cyclically varying waveform, and means recording the phase relationship of said predetermined relationship to a cycle of said cyclically varying potential.

6. Logging apparatus according to claim 5 in which said housing is adapted to be moved through a drill stem and in which said electrode means is flexible so as to pass through a non-axial opening in a bit carried by the drill stem.

References Cited in the file of this patent

UNITED STATES PATENTS

| | | |
|---|---|---|
| 2,070,912 | McDermott | Feb. 16, 1937 |
| 2,382,609 | Dale | Aug. 14, 1945 |
| 2,623,805 | Sewell | Dec. 30, 1952 |
| 2,650,067 | Martin | Aug. 25, 1953 |
| 2,653,294 | McMillan | Sept. 22, 1953 |
| 2,718,449 | Piety et al. | Sept. 20, 1955 |
| 2,729,783 | Piety | Jan. 3, 1956 |
| 2,841,778 | Ball et al. | July 1, 1958 |